United States Patent
Takeda et al.

(10) Patent No.: US 10,340,065 B2
(45) Date of Patent: Jul. 2, 2019

(54) METHOD FOR MANUFACTURING ELECTRICAL STEEL SHEET

(71) Applicant: Nippon Steel & Sumitomo Metal Corporation, Tokyo (JP)

(72) Inventors: Kazutoshi Takeda, Tokyo (JP); Kenji Kosuge, Tokyo (JP); Satoshi Arai, Tokyo (JP); Kiyokazu Ishizuka, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/179,171

(22) Filed: Jun. 10, 2016

(65) Prior Publication Data
US 2016/0284455 A1  Sep. 29, 2016

Related U.S. Application Data

(62) Division of application No. 13/395,993, filed as application No. PCT/JP2010/065040 on Sep. 2, 2010, now abandoned.

(30) Foreign Application Priority Data

Sep. 15, 2009  (JP) ................................. 2009-213486

(51) Int. Cl.
*B05D 5/12*  (2006.01)
*H01F 1/18*  (2006.01)
(Continued)

(52) U.S. Cl.
CPC ............. *H01F 1/18* (2013.01); *B05D 3/0254* (2013.01); *C09D 5/084* (2013.01);
(Continued)

(58) Field of Classification Search
CPC .... B23B 5/16; B05D 3/02; B05D 3/00; B05D 5/00; B05D 5/02; B05D 5/12; B05D 3/0254
(Continued)

(56) References Cited

U.S. PATENT DOCUMENTS 4,496,399 A    1/1985  Haselkorn
4,618,377 A *  10/1986  Nakamura ........... C09D 123/06
                                            148/251

(Continued)

FOREIGN PATENT DOCUMENTS

CN    1227860      9/1999
CN    100465337    3/2009

(Continued)

OTHER PUBLICATIONS

Document #1,http://www.tcforensic.com.au/docs/article10.html.*
(Continued)

*Primary Examiner* — Tabassom Tadayyon Eslami
(74) *Attorney, Agent, or Firm* — Birch, Stewart, Kolasch & Birch, LLP

(57) ABSTRACT

A treatment solution is applied on a surface of a base iron; and the treatment solution is baked and dried. The treatment solution contains a first component: 100 parts by mass in solid content, and a second component composed of particles of one or more kinds selected from a group consisting of a polyolefin wax, an epoxy resin and an acrylic resin, the particles having an average particle size of 2.0 μm to 15.0 μm and a melting point of 60° C. to 140° C.: 5 parts by mass to 45 parts by mass in resin solid content. The first component contains a colloidal silica: 100 parts by mass, and an emulsion of one kind selected from a group consisting of an acrylic resin, an epoxy resin and a polyester resin which have an average particle size of 0.05 μm to 0.50 μm, or an
(Continued)

emulsion of a mixture or copolymer of two or three kinds selected from the group: 40 parts by mass to 400 parts by mass in resin solid content.

2 Claims, 1 Drawing Sheet

(51) Int. Cl.
    *C09D 5/08*     (2006.01)
    *B05D 3/02*     (2006.01)
    *H01F 1/147*     (2006.01)
    *H02K 1/12*     (2006.01)

(52) U.S. Cl.
    CPC ........... *H01F 1/14775* (2013.01); *H02K 1/12* (2013.01); *H01F 1/147* (2013.01); *Y10T 428/254* (2015.01)

(58) Field of Classification Search
    USPC ............................ 427/126.1, 372.2; 428/327
    See application file for complete search history.

(56) References Cited

U.S. PATENT DOCUMENTS

| | | | |
|---|---|---|---|
| 4,756,933 A | | 7/1988 | Quack et al. |
| 5,407,990 A | | 4/1995 | Maeda et al. |
| 5,846,660 A | * | 12/1998 | Sasaki ..................... B05D 7/51 |
| | | | 428/413 |
| 5,945,212 A | * | 8/1999 | Tanaka ................ C04B 24/2641 |
| | | | 427/385.5 |
| 5,955,201 A | | 9/1999 | Loudermilk et al. |
| 6,667,105 B1 | * | 12/2003 | Yoo .......................... C09D 5/08 |
| | | | 427/387 |
| 2006/0182988 A1 | * | 8/2006 | Yamaji .................... C09D 5/10 |
| | | | 428/629 |

FOREIGN PATENT DOCUMENTS

| | | |
|---|---|---|
| EP | 0 191 219 | 8/1986 |
| JP | 49-19078 | 5/1974 |
| JP | 50-15013 | 6/1975 |
| JP | 362241980 | 10/1987 |
| JP | 03-36284 | 2/1991 |
| JP | 03-240970 | 10/1991 |
| JP | 06-330338 | 11/1994 |
| JP | 07-41913 | 2/1995 |
| JP | 40707071 | 3/1995 |
| JP | 07-230908 | 8/1995 |
| JP | 07-308990 | 11/1995 |
| JP | 09-323066 | 12/1997 |
| JP | 10-034812 | 2/1998 |
| JP | 2003-166071 | 6/2003 |
| JP | 2004-088970 | 3/2004 |
| JP | 2005-206764 | 8/2005 |
| JP | 2007-104878 | 4/2007 |
| TW | I300094 | 8/2008 |

OTHER PUBLICATIONS

International Search Report dated Nov. 9, 2010 issued in corresponding PCT Application No. PCT/JP2010/065040.
International Preliminary Report on Patentability dated Apr. 19, 2012 issued in corresponding PCT Application No. PCT/JP2010/065040.
Extended European Search Report dated Oct. 7, 2013 issued in corresponding EP Application No. 10 81 7056.
Taiwanese Office Action dated Feb. 27, 2013, issued in corresponding Taiwanese Application No. 99130480, and an English summary thereof.
Chinese Office Action dated May 29, 2013, issued in corresponding Chinese Application No. 201080040805.9, and an English summary thereof.
Tony Cafe, T.C. Forensic Pty Limited, Physical Constants for Investigators, http://www.tcforensic.com.au/docs/article10.html; accessed on Dec. 8, 2014.

* cited by examiner

METHOD FOR MANUFACTURING ELECTRICAL STEEL SHEET

CROSS REFERENCE TO RELATED APPLICATIONS

This application is a divisional application of U.S. patent application Ser. No. 13/395,993, filed on Mar. 14, 2012, and which is a national stage application of International Application No. PCT/JP2010/065040, filed on Sep. 2, 2010, both of which are incorporated herein by reference in their entireties, and which claims the benefit of JP Application No. 2009-213486, filed on Sep. 15, 2009.

TECHNICAL FIELD

The present invention relates to an electrical steel sheet which is preferred for a material of an iron core of an electric apparatus and the like, and to a method for manufacturing the same.

BACKGROUND ART

When a motor is manufactured using an electrical steel sheet, the electrical steel sheet in a hoop shape is punched in a predetermined shape, and thereafter a plurality of such electrical steel sheets are laminated and joined to make a laminated iron core. Thereafter, a copper wire is wound around teeth or the like of the laminated iron core, and terminals, flanges, bearings, and so on for connecting the copper wire are attached thereto, which are then fixed to a case. Further, after winding the copper wire, dipping in a varnish and spraying paint are performed, and then heating for baking and drying is performed.

Such a motor includes heat sensitive parts inside. For example, an insulating film of the copper wire, terminals such as draw-out parts of the copper wire, and the like are sensitive to heat. Thus, when heat generated from the motor builds up inside, the performance of the motor may decrease or a failure may occur.

For this reason, good heat release performance is required in the laminated iron core. Regarding heat release of the laminated iron core, conventionally, there is employed a structure or the like which allows heat to diffuse mainly in a perpendicular direction to the lamination direction of the electrical steel sheet. That is, the motor is structure to release heat via the case from an end part in a radial direction of the laminated iron core (direction in parallel to a surface of the electrical steel sheet) or to release heat via a heat sink which is provided on the end part.

However, depending on the structure of the motor or the shape of the laminated iron core, it may be difficult to release heat in the radial direction of the laminated iron core. Further, even when it is possible to release heat in the radial direction of the laminated iron core, it may be difficult to sufficiently release heat. In such cases, release of heat in the lamination direction of the laminated iron core (direction perpendicular to the surface of the electrical steel sheet) is important.

In conventional arts, however, it is quite difficult to obtain high heat release performance in the lamination direction of the laminated iron core. This is similar when the laminated iron core is used for a transformer or the like.

CITATION LIST

Patent Literature

Patent Literature 1: Japanese Examined Patent Application Publication No. 50-15013
Patent Literature 2: Japanese Laid-open Patent Publication No. 03-36284
Patent Literature 3: Japanese Examined Patent Application Publication No. 49-19078
Patent Literature 4: Japanese Laid-open Patent Publication No. 06-330338
Patent Literature 5: Japanese Laid-open Patent Publication No. 09-323066
Patent Literature 6: Japanese Laid-open Patent Publication No. 2003-166071
Patent Literature 7: Japanese Laid-open Patent Publication No. 2007-104878
Patent Literature 8: Japanese Laid-open Patent Publication No. 07-41913
Patent Literature 9: Japanese Laid-open Patent Publication No. 03-240970

SUMMARY OF INVENTION

Technical Problem

It is an object of the present invention to provide an electrical steel sheet capable of improving heat release performance in a lamination direction when used in a laminated iron core, and a method for manufacturing the same.

Solution to Problem

An insulating film is formed on a surface of an electrical steel sheet. The insulating film is required to have properties such as insulation performance, corrosion resistance, weldability, adhesiveness, heat resistance, and so on. The insulating film generally contains a chemical compound such as chromate, phosphate, or the like as a main component. A heat conductivity of these chemical compounds is much lower than that of metals. This is one factor that makes it difficult to obtain high heat conductivity in the lamination direction.

Further, in a laminated iron core produced using conventional electrical steel sheets, gaps exist between the electrical steel sheets, and the existence of these gaps is one factor that makes it difficult to obtain high heat conductivity in the lamination direction. This is because the heat conductivity of the gaps is significantly low as compared to the insulating film.

The present inventors have conducted dedicated studies for solving the above-described problems in view of natures of these conventional electrical steel sheets, and devised the following aspects.

(1) An electrical steel sheet, having:
a base iron; and
an insulating film formed on a surface of the base iron, wherein the insulating film contains:
a first component containing a metal phosphate: 100 parts by mass; and
a second component composed of particles of one or more kinds selected from a group consisting of a polyolefin wax, an epoxy resin and an acrylic resin, the particles having an average particle size of 2.0 µm to 15.0 µm and a melting point of 60° C. to 140° C.: 5 parts by mass to 45 parts by mass.

(2) An electrical steel sheet, having:
a base iron; and
an insulating film formed on a surface of the base iron, wherein the insulating film contains:
a first component: 100 parts by mass, the first component containing:
   a metal phosphate: 100 parts by mass; and
   one kind selected from a group consisting of an acrylic resin, an epoxy resin and a polyester resin which have an average particle size of 0.05 µm to 0.50 µm, or a mixture or copolymer of two or three kinds selected from the group: 1 part by mass to 50 parts by mass; and
a second component composed of particles of one or more kinds selected from a group consisting of a polyolefin wax, an epoxy resin and an acrylic resin, the particles having an average particle size of 2.0 µm to 15.0 µm and a melting point of 60° C. to 140° C.: 5 parts by mass to 40 parts by mass.

(3) An electrical steel sheet, having:
a base iron; and
an insulating film formed on a surface of the base iron, wherein the insulating film contains:
a first component: 100 parts by mass, the first component containing:
   a colloidal silica: 100 parts by mass; and
   one kind selected from a group consisting of an acrylic resin, an epoxy resin and a polyester resin which have an average particle size of 0.05 µm to 0.50 µm, or a mixture or copolymer of two or three kinds selected from the group: 40 parts by mass to 400 parts by mass; and
a second component composed of particles of one or more kinds selected from a group consisting of a polyolefin wax, an epoxy resin and an acrylic resin, the particles having an average particle size of 2.0 µm to 15.0 µm and a melting point of 60° C. to 140° C.: 5 parts by mass to 40 parts by mass.

(4) The electrical steel sheet according to any one of (1) to (3), wherein the first component and the second component account for 90% or more of the insulating film.

(5) A method for manufacturing an electrical steel sheet, having:
applying a treatment solution on a surface of a base iron; and
baking and drying the treatment solution,
wherein the treatment solution contains:
a first component containing a metal phosphate: 100 parts by mass; and
a second component composed of particles of one or more kinds selected from a group consisting of a polyolefin wax, an epoxy resin and an acrylic resin, the particles having an average particle size of 2.0 µm to 15.0 µm and a melting point of 60° C. to 140° C.: 5 parts by mass to 45 parts by mass in resin solid content.

(6) A method for manufacturing an electrical steel sheet, having:
applying a treatment solution on a surface of a base iron; and
baking and drying the treatment solution,
wherein the treatment solution contains:
a first component: 100 parts by mass in solid content, the first component containing:
   a metal phosphate: 100 parts by mass; and
   an emulsion of one kind selected from a group consisting of an acrylic resin, an epoxy resin, and a polyester resin which have an average particle size of 0.05 µm to 0.50 µm, or an emulsion of a mixture or copolymer of two or three kinds selected from the group: 1 part by mass to 50 parts by mass in resin solid content; and
a second component composed of particles of one or more kinds selected from a group consisting of a polyolefin wax, an epoxy resin and an acrylic resin, the particles having an average particle size of 2.0 µm to 15.0 µm and a melting point of 60° C. to 140° C.: 5 parts by mass to 40 parts by mass in resin solid content.

(7) A method for manufacturing an electrical steel sheet, having:
applying a treatment solution on a surface of a base iron; and
baking and drying the treatment solution,
wherein the treatment solution contains:
a first component: 100 parts by mass in solid content, the first component containing:
   a colloidal silica: 100 parts by mass; and
   an emulsion of one kind selected from a group consisting of an acrylic resin, an epoxy resin and a polyester resin which have an average particle size of 0.05 µm to 0.50 µm, or an emulsion of a mixture or copolymer of two or three kinds selected from the group: 40 parts by mass to 400 parts by mass in resin solid content; and
a second component composed of particles of one or more kinds selected from a group consisting of a polyolefin wax, an epoxy resin and an acrylic resin, the particles having an average particle size of 2.0 µm to 15.0 µm and a melting point of 60° C. to 140° C.: 5 parts by mass to 40 parts by mass in resin solid content.

(8) The method for manufacturing an electrical steel sheet according to any of (5) to (7), wherein a temperature to be reached in the baking and drying is 150° C. to 300° C., and a time therefor is 3 seconds to 15 seconds.

(9) The method for manufacturing an electrical steel sheet according to any one of (5) to (8), wherein the first component and the second component account for 90% or more of the treatment solution when it is converted into a solid content.

Advantageous Effects of Invention

According to the present invention, a predetermined second component is included in an insulating film, and this component can melt and solidify when a laminated iron core is produced, thereby reducing the gaps in the laminated iron core. Thus, heat release performance in a lamination direction in the laminated iron core can be improved.

DESCRIPTION OF EMBODIMENTS

Hereinafter, an embodiment of the present invention will be described with reference to the attached drawings. FIG.

Figure 1:
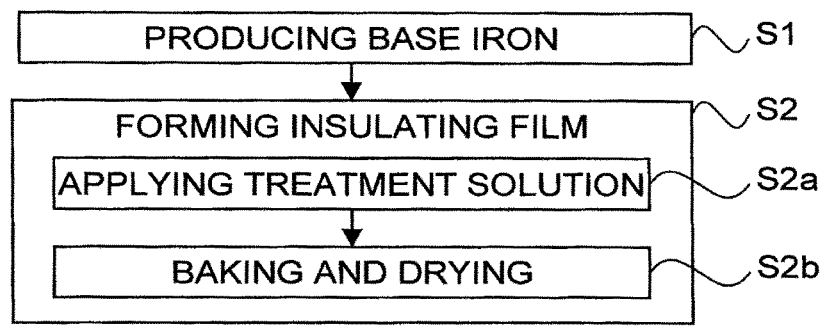
FIG. 1 is a flowchart illustrating a method for manufacturing an electrical steel sheet according to an embodiment of the present invention.
Figure 2:
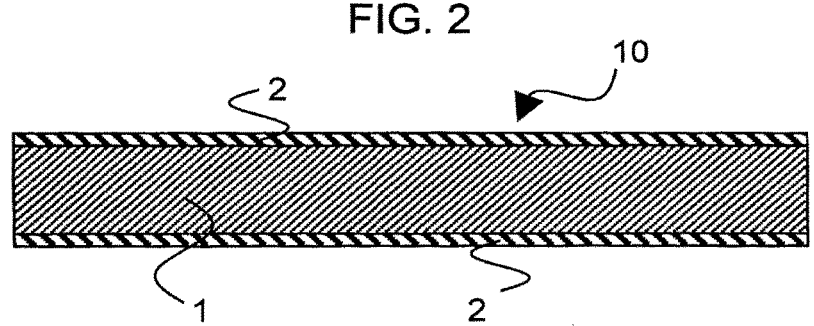
FIG. 2 is a cross-sectional view illustrating a structure of an electrical steel sheet according to an embodiment of the present invention.

1 is a flowchart illustrating a method for manufacturing an electrical steel sheet according to an embodiment of the present invention, and FIG. 2 is a cross-sectional view illustrating a structure of an electrical steel sheet according to an embodiment of the present invention.

In this embodiment, first, a base iron 1 is produced (step S1). In production of the base iron 1, for example, first a slab with a predetermined composition is heated at about 1150° C. to 1250° C. and is hot rolled to produce a hot-rolled steel sheet, and the hot-rolled steel sheet is coiled. Next, the hot-rolled steel sheet is cold rolled while being unwound to produce a cold-rolled steel sheet with a thickness of about 0.15 mm to 0.5 mm, and the cold-rolled steel sheet is coiled. Thereafter, the steel sheet is annealed (finish annealed) at 750° C. to 1100° C. In this manner, the base iron 1 is obtained. In addition, the steel sheet may be annealed in the range of 800° C. to 1050° C. as necessary before the cold rolling.

The composition of the base iron 1 is one suitable for a non-oriented electrical steel sheet, for example. Specifically, the base iron 1 contains, for example, Si: 0.1 mass % or more and Al: 0.05 mass % or more with the balance being composed of Fe and inevitable impurities. In addition, besides the Si and Al, Mn: 0.01 mass % or more and 1.0 mass % or less may be contained. Further, the contents of representative elements such as S, N and C are preferred to be less than 100 ppm, and more preferred to be less than 20 ppm. The higher the content of Si is, the higher its electric resistance is and the higher its magnetic property is. However, when the content of Si is more than 4.0 mass %, the brittleness thereof may be significant. Thus, the content of Si is preferred to be 4.0 mass % or less. Further, the higher the content of Al is, the higher its magnetic property is. However, when the content of Al is more than 3.0 mass %, the cold rolling when the base iron 1 is produced may be difficult. Thus, the content of Al is preferred to be 3.0 mass % or less.

In addition, the composition of the base iron 1 may be one suitable for a grain-oriented electrical steel sheet non-oriented electrical steel.

Further, the lower the surface roughness of the base iron 1 is, the higher the adhesiveness between electrical steel sheets in a laminated iron core is. Accordingly, the centerline average roughness (Ra) in the rolling direction of the base iron 1 and in a direction (width direction) orthogonal to the rolling direction is preferred to be 1.0 μm or lower, and more preferred to be 0.5 μm or lower. When the centerline average roughness (Ra) is higher than 1.0 μm, the adhesiveness between electrical steel sheets is low, with which it is difficult to obtain high heat conductivity in a lamination direction. Incidentally, to make the centerline average roughness (Ra) be lower than 0.1 μm, it may be necessary to strictly perform control of the cold rolling, which often leads to high costs. Thus, it is preferred that the centerline average roughness (Ra) be 0.1 μm or higher.

Next, as illustrated in FIG. 2, an insulating film 2 is formed on a surface of the base iron 1 (step S2). In formation of the insulating film 2, a certain treatment solution is applied on the surface of the base iron 1 (step S2a), and thereafter the treatment solution is dried by heating (step S2b). As a result, the components in the treatment solution are baked onto the surface of the base iron 1. The method of applying the treatment solution is not particularly limited. For example, the treatment solution may be applied using a roll coater or spray, or the base iron 1 may be dipped into the treatment solution. The method of drying the treatment solution is also not particularly limited. For example, an ordinary radiation furnace or air heating furnace may be used to dry the treatment solution, or the treatment solution may be dried by heating using electric energy such as induction heating. Regarding the conditions of the drying and baking of the treatment solution (step S2b), the temperature (baking temperature) for this treatment is preferred to be 150° C. to 300° C., and the time for this treatment is preferred to be 3 seconds to 15 seconds. In particular, when a metal phosphate is contained in the treatment solution as will be described later, the baking temperature is preferred to be 230° C. to 300° C.

Additionally, pretreatment may be performed on the surface of the base iron 1 before applying the treatment solution. Examples of the pretreatment include degreasing treatment using an alkaline solution or the like, and acid cleaning treatment using a hydrochloric acid, a sulfuric acid, a phosphoric acid, or the like.

Here, the treatment solution used for forming insulating film 2 will be described. To classify broadly, the following three kinds ((a) to (c)) may be used as the treatment solution.

(a) A treatment solution containing:
a first component containing a metal phosphate: 100 parts by mass; and
a second component composed of particles of one or more kinds selected from a group consisting of a polyolefin wax, an epoxy resin and an acrylic resin, the particles having an average particle size of 2.0 μm to 15.0 μm and a melting point of 60° C. to 140° C.: 5 parts by mass to 45 parts by mass in resin solid content.

(b) A treatment solution containing:
a first component: 100 parts by mass in solid content, the first component containing:
a metal phosphate: 100 parts by mass; and
an emulsion of one kind selected from a group consisting of an acrylic resin, an epoxy resin and a polyester resin which have an average particle size of 0.05 μm to 0.50 μm, or an emulsion of a mixture or copolymer of two or three kinds selected from the group: 1 part by mass to 50 parts by mass in resin solid content; and
a second component composed of particles of one or more kinds selected from a group consisting of a polyolefin wax, an epoxy resin and an acrylic resin, the particles having an average particle size of 2.0 μm to 15.0 μm and a melting point of 60° C. to 140° C.: 5 parts by mass to 45 parts by mass in resin solid content.

(c) A treatment solution containing:
a first component: 100 parts by mass in solid content, the first component containing:
a colloidal silica: 100 parts by mass; and
an emulsion of one kind selected from a group consisting of an acrylic resin, an epoxy resin and a polyester resin which have an average particle size of 0.05 μm to 0.50 μm, or an emulsion of a mixture or copolymer of two or three kinds selected from the group: 40 parts by mass to 400 parts by mass in resin solid content; and
a second component composed of particles of one or more kinds selected from a group consisting of a polyolefin wax, an epoxy resin and an acrylic resin, the particles having an average particle size of 2.0 μm to 15.0 μm and a melting point of 60° C. to 140° C.: 5 parts by mass to 40 parts by mass in resin solid content.

Incidentally, the total amount of the first component and the second component is preferred to be 90% or more of the entire treatment solution when it is converted into a solid content. This is for assuring good insulation performance, heat conductivity, heat resistance, and so on of the insulating film.

Regarding the first component, the kind of the phosphoric acid composing the metal phosphate is not particularly limited, and for example, an orthophosphoric acid, a metaphosphoric acid, a polyphosphoric acid, or the like may be used. The kind of metal ions composing the metal phosphate is also not particularly limited, and light metals such as Li, Al, Mg, Ca, Sr, and Ti are preferred, where Al and Ca are particularly preferred. Further, it is preferred to prepare the metal phosphate solution by mixing an oxide of a metal ion, a carbonate, and/or a hydroxide in an orthophosphoric acid, for example.

As the metal phosphate, just one kind may be used, or two or more kinds may be mixed and used. The first component may contain additives such as phosphoric acid and/or boric acid.

Regarding the first component, as the colloidal silica, it is preferred to use, for example, one having an average particle size of 5 nm to 40 nm and having an Na content of 0.5 mass % or less. Further, the Na content of the colloidal silica is more preferred to be 0.01 mass % to 0.3 mass %.

In the embodiment, it is preferred that the first component contain an emulsion of an acrylic resin, an epoxy resin and/or a polyester resin. In particular, when the first component does not contain a metal phosphate but contains a colloidal silica, it is easy to form an even insulating film 2 when the first component contains an acrylic resin and/or an epoxy resin.

As the emulsion of an acrylic resin, an epoxy resin and/or a polyester resin, a commercially available resin emulsion may be used. The melting points of the acrylic resin, the epoxy resin and/or the polyester resin are not particularly limited, and are preferred to be 50° C. or lower. When the melting points are higher than 50° C., they are prone to generate powder. Further, in view of costs, the melting points are preferred to be 0° C. or higher.

As the acrylic resin, preferred ones are methyl acrylate, ethyl acrylate, n-butyl acrylate, i-butyl acrylate, n-octyl acrylate, i-octyl acrylate, 2-ethylhexyl acrylate, n-nonyl acrylate, n-decyl acrylate, n-dodecyl acrylate, and the like which are normal monomers. As the acrylic resin, acrylic acid, methacrylic acid, maleic acid, maleic anhydride, fumaric acid, crotonic acid, and itaconic acid, which are monomers having a functional group are also preferred. As the acrylic resin, ones obtained by copolymerizing 2-hydroxylethyl (metha) acrylate, 2-hydroxylpropyl (metha) acrylate, 3-hydroxylbutyl (metha) acrylate, 2-hydroxylethyl (metha) allyl ether, and the like, which are monomers having a hydroxyl group, are also preferred.

As the epoxy resin, for example, there are ones obtained by bringing a carboxylic anhydride into reaction with an amine-denatured epoxy resin. Specifically, there are bisphenol A diglycidyl ether, a ring-opening adduct of caprolactone of bisphenol A diglycidyl ether, bisphenol F diglycidyl ether, bisphenol S diglycidyl ether, novolak glycidyl ether, dimer acid glycidyl ether, and the like. As the amine for denaturing, there are isopropanolamine, monopropanolamine, monobutanolamine, monoethanolamine, diethylenetriamine, ethylenediamine, butalamine, propylamine, isophoronediamine, tetrahydrofurfurylamine, xylenediamine, hexylamine, nonylamine, triethylenetetramine, tetramethylenepentamine, diaminodiphenylsulfone, and the like. As the carboxylic anhydride, ones obtained by reaction with succinic anhydride, itaconic anhydride, maleic anhydride, citraconic anhydride, phthalic anhydride, trimellitic anhydride, or the like are preferred.

As the polyester resin, for example, ones obtained by bringing a dicarboxylic acid and a glycol are preferred. As the dicarboxylic acid, there are terephthalic acid, isophthalic acid, orthophthalic acid, naphthalene dicarboxylic acid, biphenyl dicarboxylic acid, succinic acid, adipic acid, sebacic acid, fumaric acid, maleic acid, maleic anhydride, itaconic acid, citraconic acid, and the like. As the glycol, there are ethylene glycol, 1,2-propylene glycol, 1,3-propanediol, 1,4-butanediol, 1,5-pentanediol, neopentyldiol 1,6-hexanediol, triethylene glycol, dipropylene glycol, polyethylene glycol, and the like. One obtained by graft polymerizing acrylic acid, methacrylic acid, maleic acid, fumaric acid, itaconic acid, citraconic acid, or methacrylic acid anhydride, or the like with these polyester resins may also be used.

As the acrylic resin, the epoxy resin, and the polyester resin, just one kind may be used, or two or more kinds may be mixed and used. Note that as these organic resins, ones having an average particle size of 0.05 µm to 0.50 µm are used. When the average particle size is smaller than 0.05 µm, it aggregates easily in the treatment solution, and the evenness of the insulating film 2 decreases easily. On the other hand, when the average particle size is larger than 0.50 µm, the stability of the treatment solution decreases easily. Further, the average particle size is preferred to be 0.1 µm or larger and preferred to be 0.3 µm or smaller. Incidentally, for the average particle size, for example, a number average particle size regarding particles having a particle size of 1 µm or smaller may be used.

Regarding the mixing ratio of the metal phosphate with the acrylic resin, the epoxy resin, and the polyester resin, the total amount of the acrylic resin, the epoxy resin, and the polyester resin relative to 100 parts by mass of the metal phosphate is 1 part by mass to 50 parts by mass. When the total amount of the acrylic resin, the epoxy resin, and the polyester resin is less than 1 part by mass, an aggregation of the acrylic resin, the epoxy resin, and the polyester resin occurs easily, and the evenness of the insulating film 2 decreases easily. On the other hand, when the total amount of the acrylic resin, the epoxy resin, and the polyester resin is more than 50 parts by mass, heat resistance may be poor.

Further, regarding the miring ratio of the colloidal silica with the acrylic resin, the epoxy resin, and the polyester resin, the total amount of the acrylic resin, the epoxy resin, and the polyester resin relative to 100 parts by mass of the colloidal silica is 40 parts by mass to 400 parts by mass. When the total amount of the acrylic resin, the epoxy resin, and the polyester resin is less than 40 parts by mass, it is difficult to properly form the insulating film 2, and it is possible that the insulating film 2 generates powder. On the other hand, when the total amount of the epoxy resin and the polyester resin is more than 400 parts by mass, heat resistance may be poor.

Regarding the second component, as the particles of the polyolefin wax, the epoxy resin, and/or the acrylic resin, particles having an average particle size of 2.0 µm to 15.0 µm and having a melting point of 60° C. to 140° C. are used. Among epoxy resins, there are ones whose melting point cannot be determined clearly, and for such epoxy resins, a softening point is used instead of the melting point. When particles of the polyolefin wax are used, it is particularly preferred to use ones obtained by dispersing particles of a low molecular weight type polyethylene in advance in an aqueous solution with a small amount of surfactant. As particles of the epoxy resin, either of ones which are dispersed forcibly and ones which are self-emulsifying types may be used. The self-emulsifying type ones are particularly excellent in stability in the treatment solution. For example, one obtained by graft polymerizing a polyvinyl alcohol with an ordinary epoxy resin, or the like is particularly preferred. As particles of the acrylic resin, numerous dispersion solution types are commercially available, and it is preferred to use such ones.

Incidentally, these particles may be used solely or two or more kinds may be mixed and used. Further, these particles may be used in a powder state.

The average particle size of particles of the polyolefin wax, the epoxy resin, and/or the acrylic resin is 2.0 μm to 15.0 μm as described above. When the average particle size is smaller than 2.0 μm, although details of which will be described later, it is difficult to sufficiently improve the heat conductivity between electrical steel sheets in the laminated iron core. On the other hand, when the average particle size is larger than 15.0 μm, it is possible that the lamination factor thereof in the laminated iron core decreases. The average particle size is preferred to be 4.0 μm or larger and preferred to be 10.0 μm or smaller. For the average particle size here, for example, a number average particle size regarding particles having a particle size of 2 μm or larger may be used.

Further, the melting points of particles of the polyolefin wax, the epoxy resin, and/or the acrylic resin are at 60° C. to 140° C. as described above. When the melting points are lower than 60° C., particles may melt and evaporate during baking and drying of the treatment solution (step S2b). On the other hand, when the melting points are higher than 140° C., although details of which will be described later, the particles do not melt during heating when the laminated iron core is produced from electrical steel sheets, and it is difficult to improve the heat conductivity. The molecular weight of the polyolefin wax is preferred to be 800 to 40000, and the melting point of the polyolefin wax is preferred to be 100° C. or higher and preferred to be 130° C. or lower. The molecular weights of the epoxy resin and the acrylic resin are preferred to be 1000 to 50000, and the melting points of the epoxy resin and the acrylic resin are preferred to be 80° C. or higher and preferred to be 110° C. or lower.

Regarding the mixing ratio of the first component and the second component, when the treatment solution (a) is used, that is, when the acrylic resin, the epoxy resin and the polyester resin are not contained in the first component, the amount of the second component relative to 100 parts by mass in solid content of the first component is 5 parts by mass to 45 parts by mass. When the amount of the second component is less than 5 parts by mass, although details of which will be described later, it is difficult to sufficiently improve the heat conductivity. On the other hand, when the amount of the second component is more than 45 parts by mass, it is difficult to form the insulating film 2 properly, and it is possible that the insulating film 2 generates powder when the electrical steel sheets are slit, or the like.

When the treatment solution (b) or (c) is used, that is, when the acrylic resin, the epoxy resin, and/or the polyester resin are contained in the first component, the amount of the second component relative to 100 parts by mass in solid content of the first component is 5 parts by mass to 40 parts by mass. When the amount of the second component is less than 5 parts by mass, although details of which will be described later, it is difficult to improve the heat conductivity sufficiently. On the other hand, when the amount of the second component is more than 40 parts by mass, heat resistance of the insulating film 2 decreases and/or a defect easily occurs in the insulating film 2.

In addition, additives such as a surfactant and the like may be added to the above-described treatment solution. As the surfactant, non-ion surfactants are preferred. Besides that, a brightener, an antiseptic, an antioxidant, and the like may be added.

Figure 3:
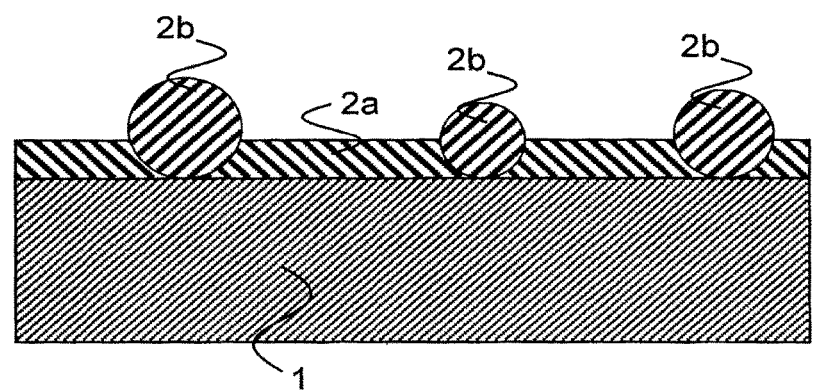
FIG. 3 is a schematic view illustrating an insulating film.

The insulating film 2 of the electrical steel sheet 10 formed by the method has a structure in which, as illustrated in FIG. 3, particles 2b of the second component are dispersed and fixed in a base 2a (binding part) formed by solidification of the first component. The thickness of the base 2a is preferred to be about 0.3 μm to 3.0 μm, and more preferred to be 0.5 μm or larger and 1.5 μm or smaller.

When the laminated iron core is produced, as described above, the electrical steel sheets are laminated, dipping into a varnish and/or spraying paint are performed, and then heating for baking and drying are further performed. In the electrical steel sheet of this embodiment, the particles 2b melt during this heating. Thus, the particles permeate through gaps in the electrical steel sheets and solidify thereafter. As a result, gaps in the laminated iron core decrease, and the heat conductivity in the lamination direction of the laminated iron core (direction perpendicular to the surface of the electrical steel sheet) improves significantly.

In addition, the average particle sizes of the above-described colloidal silica, acrylic resin, epoxy resin and polyester resin as well as polyolefin wax, epoxy resin and acrylic resin are number average particle sizes. As the number average particle size of the colloidal silica, for example, one measured by a nitrogen absorption method (JIS Z8830) is used. Further, as the number average particle sizes of the acrylic resin, the epoxy resin and the polyester resin as well as the polyolefin wax, the epoxy resin and the acrylic resin, for example, ones measured by a laser diffraction method are used.

As the treatment solution here, it is preferred to use one containing no Cr in consideration of environment.

Further, regarding the structure of the insulating film 2, the average of heights of top portions of the particles 2b with reference to the surface of the base 2a is preferred to be about 2 μm to 3 μm. This is for effectively embedding gaps accompanying melting of the particles 2b.

When the treatment solution (a) is used, the insulating film 2 includes:
  a first component containing a metal phosphate: 100 parts by mass; and
  a second component composed of particles of one or more kinds selected from a group consisting of a polyolefin wax, an epoxy resin and an acrylic resin, the particles having an average particle size of 2.0 μm to 15.0 μm and a melting point of 60° C. to 140° C.: parts by mass to 45 parts by mass.

When the treatment solution (b) is used, the insulating film 2 includes:
  a first component: 100 parts by, the first component containing:
    a metal phosphate: 100 parts by mass; and
    one kind selected from a group consisting of an acrylic resin, an epoxy resin and a polyester resin which have an average particle size of 0.05 μm to 0.50 μm, or a mixture or copolymer of two or three kinds selected from the group: 1 part by mass to 50 parts by mass; and a second component composed of particles of one or more kinds selected from a group consisting of a polyolefin wax, an epoxy resin and an acrylic resin, the particles having an average particle size of 2.0 μm to 15.0 μm and a melting point of 60° C. to 140° C.: 5 parts by mass to 40 parts by mass.

When the treatment solution (c) is used, the insulating film 2 includes:

a first component: 100 parts by mass, the first component containing:
   a colloidal silica: 100 parts by mass; and
   one kind selected from a group consisting of an acrylic resin, an epoxy resin and a polyester resin which have an average particle size of 0.05 μm to 0.50 μm, or a mixture or copolymer of two or three kinds selected from the group: 40 parts by mass to 400 parts by mass; and
a second component composed of particles of one or more kinds selected from a group consisting of a polyolefin wax, an epoxy resin and an acrylic resin, the particles having an average particle size of 2.0 μm to 15.0 μm and a melting point of 60° C. to 140° C.: 5 parts by mass to 40 parts by mass in.

Incidentally, it is preferred that the first component and the second component account for 90% or more of the insulating film 2. This is for assuring good insulation performance, heat conductivity, heat resistance, and so on.

EXAMPLE

A base iron having a composition for a non-oriented electrical steel sheet containing Si: 2.5 mass %, Al: 0.5 mass %, and Mn: 0.05 mass % was produced. The thickness of the base iron was 0.35 mm, and the centerline average roughness (Ra) was 0.42 μm.

Further, various solutions for the first component were prepared. The components of these solutions are illustrated in Table 1.

Regarding the solutions containing a metal phosphate, an orthophosphoric acid and metal hydroxides such as $Mg(OH)_2$ and $Al(OH)_3$, a metal oxide and a metal carbonate were mixed and stirred, thereby preparing an aqueous solution of 40 mass %.

Regarding the solutions containing a colloidal silica, a solution containing 30 mass % of commercially available colloidal silica having an average particle size of 15 nm with a surface being modified by aluminum, and a solution containing 40 mass % of colloidal silica having an average particle size of 25 nm were prepared. The former was called colloidal silica 1 and the latter was called colloidal silica 2.

Details of the eight kinds of organic resins in Table 1 are as follows.

[Acrylic Resin 1]

This is an acrylic resin obtained by copolymerizing a methyl methacrylate: 60 mass %, a 2-hydroxyethyl methacrylate: 15 mass %, and a lauryl methacrylate: 25 mass %.

[Acrylic Resin 2]

This is an acrylic resin obtained by mixing a fumaric acid: 20 mass %, a methyl acrylate: 30 mass %, a butyl acrylate: 35 mass %, and a styrene monomer: 15 mass %.

[Acrylic Resin 3]

This is an acrylic resin, which does not have a carboxyl group and a hydroxyl group, obtained by copolymerizing a methyl acrylate: 60 mass %, a styrene monomer: 20 mass %, and an isobutyl acrylate: 20 mass %.

[Epoxy Resin 1]

This is a carboxyl-group denatured epoxy resin obtained by denaturing a bisphenol A with a triethanolamine and thereafter bringing a succinic anhydride into reaction therewith.

[Epoxy Resin 2]

This is an epoxy resin obtained by blending an ethylene propylene block polymer with a phenol-novolac epoxy resin and adding a nonylphenyl ether ethylene oxide thereto, thereby making it a self-emulsifying type.

TABLE 1

| SOLUTION No. FOR FIRST COMPONENT | METAL PHOSPHATE OR COLLOIDAL SILICA | KIND OF ORGANIC RESIN | PART BY MASS OF ORGANIC RESIN | OTHER ADDITIVES |
|---|---|---|---|---|
| 1 | MAGNESIUM PHOSPHATE | ACRYLIC RESIN 1 | 30 | |
| 2 | ALUMINUM PHOSPHATE | — | — | |
| 3 | ALUMINUM PHOSPHATE | ACRYLIC RESIN 1 | 4 | |
| 4 | CALCIUM PHOSPHATE | EPOXY RESIN 1 | 45 | |
| 5 | ALUMINUM PHOSPHATE + MAGNESIUM PHOSPHATE | POLYESTER RESIN | 22 | |
| 6 | CALCIUM PHOSPHATE | ACRYLIC RESIN 1 | 30 | |
| 7 | NICKEL PHOSPHATE | — | — | PHOSPHONIC ACID: 5 PARTS BY MASS |
| 8 | MANGANESE PHOSPHATE | ACRYLIC RESIN 1 | 12 | BORIC ACID: 2 PARTS BY MASS |
| 9 | COLLOIDAL SILICA 1 | ACRYLIC RESIN 1 | 200 | |
| 10 | COLLOIDAL SILICA 1 | ACRYLIC RESIN 2 | 400 | |
| 11 | COLLOIDAL SILICA 2 | ACRYLIC RESIN 3 | 50 | |
| 12 | MAGNESIUM PHOSPHATE | AQUEOUS POLYURETHANE | 40 | |
| 13 | ALUMINUM PHOSPHATE | EPOXY RESIN 2 | 60 | |
| 14 | ALUMINUM PHOSPHATE | ACRYLIC RESIN 3 | 0.6 | |
| 15 | COLLOIDAL SILICA 1 | PHENOL RESIN | 100 | |
| 16 | COLLOIDAL SILICA 2 | ACRYLIC RESIN 1 | 480 | |
| 17 | COLLOIDAL SILICA 1 | EPOXY RESIN 1 | 30 | |

13

[Polyester Resin]

This is a polyester resin containing a carboxyl-group obtained by copolymerizing a dimethyl terephthalate: 40 mass % and a neopentyl glycol: 40 mass % and thereafter graft polymerizing a fumaric acid: 10 mass % and a trimellitic anhydride: 10 mass %.

[Aqueous Polyurethane]

This is an aqueous polyurethane synthesized from a hexamethylene diisocyanate and a polyethylene glycol by a known method.

[Phenol Resin]

This is a resole-type phenol resin water-system emulsion.

These organic resins were each made as a 30% emulsion solution, and they were mixed with a solution containing a metal phosphate or a colloidal silica. Furthermore, a proper amount of viscosity improver and surfactant was added as necessary to prepare the solutions illustrated in Table 1.

Here, average particle sizes of the acrylic resins 1, 2, 3 were 0.15 µm, 0.25 µm, 0.6 µm, respectively. The average particle size of the epoxy resin 1 was 0.28 µm, and the average particle size of the epoxy resin 2 was 0.56 µm. The average particle size of the polyester resin was 0.3 µm, the average particle size of the aqueous polyurethane was 0.22 µm, and the average particle size of the phenol resin emulsion was 0.65 µm. In measurement of these average particle sizes, the resin emulsion was diluted with distilled water, and thereafter a number average particle size was measured with a commercially available particle size measuring device using a laser diffraction method according to a JIS method (JIS Z8826). Note that the parts by mass of resins in Table 1 are values converted into a solid content.

Next, certain amounts of particles of polyolefin waxes, epoxy resins, or acrylic resins illustrated in Table 2 were added to the solutions illustrated in Table 1.

14

Details of the eight kinds of particles in Table 2 are as follows.

[Polyolefin Wax 1]

This is a low molecular weight polyethylene type and has an average particle size of 6 µm, a melting point of 132° C., and a molecular weight of 2000.

[Polyolefin Wax 2]

This is a polyethylene type and has an average particle size of 9.5 µm, a melting point of 110° C., and a molecular weight of 7200.

[Polyolefin Wax 3]

This is an ionomer type and has an average particle size of 0.5 µm, a melting point of 65° C., and a molecular weight of 4000.

[Polyolefin Wax 4]

This is an ethylene-vinyl acetate copolymer type and has an average particle size of 12 µm, a melting point of 40° C., and a molecular weight of 20000.

[Epoxy Resin 1]

This is an epoxy resin obtained by adding 3 mass % of polyoxyalkylene polycyclic phenyl ether to a bisphenol A type epoxy resin with an epoxy equivalent of 620. Its average particle size is 2.4 µm, melting point is at 83° C., and molecular weight is 1200.

[Epoxy Resin 2]

This is an epoxy resin obtained by adding 2.5 mass % of polyoxyethylene phenyl ethers to a bisphenol F epoxy resin. Its average particle size is 1.5 µm, melting point is at 128° C., and molecular weight is 2500.

[Acrylic Resin 1]

This is an acrylic resin obtained by copolymerizing a methyl methacrylate: 40 mass %, a styrene: 40 mass %, 2-ethylhexyl acrylate: 13 mass %, and an ethylene glycol

TABLE 2

| | SAMPLE No. | SOLUTION No. FOR FIRST COMPONENT | KIND OF PARTICLES | ADDED PARTICLE AMOUNT (PART BY MASS) | BAKING CONDITION TEMPERATURE (° C.) | TIME (SEC) |
|---|---|---|---|---|---|---|
| EXAMPLE | 1 | 1 | POLYOLEFIN 1 | 20 | 230 | 6 |
| | 2 | 2 | POLYOLEFIN 1 | 40 | 260 | 6 |
| | 3 | 2 | POLYOLEFIN 2 | 7 | 260 | 6 |
| | 4 | 3 | EPOXY RESIN 1 | 34 | 380 | 4 |
| | 5 | 3 | ACRYLIC RESIN 1 | 24 | 280 | 3 |
| | 6 | 4 | ACRYLIC RESIN 2 | 24 | 230 | 12 |
| | 7 | 5 | POLYOLEFIN 1 | 16 | 230 | 12 |
| | 8 | 6 | POLYOLEFIN 1 | 20 | 180 | 30 |
| | 9 | 7 | POLYOLEFIN 2 | 10 | 230 | 6 |
| | 10 | 8 | POLYOLEFIN 2 | 10 | 230 | 6 |
| | 11 | 9 | POLYOLEFIN 2 | 30 | 200 | 6 |
| | 12 | 10 | POLYOLEFIN 2 | 20 | 160 | 38 |
| | 13 | 11 | POLYOLEFIN 2 | 33 | 300 | 6 |
| COMPARATIVE EXAMPLE | 14 | 12 | POLYOLEFIN 1 | 16 | 230 | 12 |
| | 15 | 13 | POLYOLEFIN 2 | 10 | 230 | 6 |
| | 16 | 14 | POLYOLEFIN 2 | 10 | 230 | 6 |
| | 17 | 15 | POLYOLEFIN 2 | 30 | 200 | 6 |
| | 18 | 16 | POLYOLEFIN 2 | 20 | 160 | 15 |
| | 19 | 17 | POLYOLEFIN 2 | 33 | 300 | 2 |
| | 20 | 1 | POLYOLEFIN 3 | 20 | 230 | 6 |
| | 21 | 4 | POLYOLEFIN 4 | 30 | 280 | 3 |
| | 22 | 2 | EPOXY RESIN 2 | 40 | 260 | 6 |
| | 23 | 3 | POLYOLEFIN 1 | 4 | 260 | 6 |
| | 24 | 3 | POLYOLEFIN 1 | 60 | 230 | 6 |
| | 25 | 8 | POLYOLEFIN 2 | 3 | 260 | 6 |
| | 26 | 8 | POLYOLEFIN 2 | 50 | 230 | 6 | dimethacrylate: 7 mass %. Its average particle size is 3.8 µm, melting point is at 65° C., and molecular weight is 13000.

[Acrylic Resin 2]

This is an acrylic resin obtained by further copolymerizing a vinyl acetate with the acrylic resin 1. Its average particle size is 5.5 µm, melting point is at 80° C., and molecular weight is 20000.

Dispersion solutions in which these particles were adjusted to 40 mass % were prepared, which were then used as a treatment solution in an experiment.

Note that the molecular amount of particles illustrated in Table 2 were measured by GPC (Gel Permeation Chromatography). Further, in measurement of the average particle sizes of the above-described particles, a dispersion solution was dispersed in distilled water for about one minute by an ultrasonic cleaner, and thereafter a number average particle size was measured with a commercially available particle size measuring device using a laser diffraction method according to a JIS method (JIS Z8826). The melting points of the particles were measured using a commercially available differential scanning calorimeter according to a JIS method (JIS K7121).

Then the treatment solutions (dispersion solutions) were applied on a base iron and baked under the conditions illustrated in Table 2. The treatment solutions were applied using a roll coater. At this time, the amount of pressing down with the roll and so on were adjusted so that the thickness of the base of the insulating film would be 1.0 µm. The baking (drying) was performed using a radiation furnace, and the setting of the furnace temperature was adjusted so as to obtain the predetermined heating conditions noted in Table 2. They were adjusted so that the sheet temperatures reached would be 150° C. to 410° C., and the baking times would be 2 seconds to 40 seconds.

Then, various properties of the electrical steel sheets obtained after the baking was finished were evaluated. Specifically, evaluation was performed on heat conductivity, insulation performance, adhesiveness, corrosion resistance, appearance, heat resistance, and surface roughness.

It is difficult to accurately measure the heat conductivity of an insulating film formed on the surface of a base iron. Accordingly, the heat conductivity was evaluated by the following method. Specifically, first, an electrical steel sheet on which an insulating film was formed was cut into 30 mm square pieces, and 50 pieces of them were laminated to obtain a laminate sample. Next, the laminate sample was heated in an air heating furnace at 150° C. for 120 minutes while being pressurized by 10 kgf/cm$^2$ (approximately 98 N/cm$^2$), and then let cool to the room temperature. This was for simulating baking of the varnish or powder coating. Subsequently, in a state that its periphery was covered with a thermal insulator, the laminate sample was pressure-bonded by a pressurizing force of 20 kgf/cm$^2$ (approximately 196 N/cm$^2$) onto a heating element heated to 200° C. Then, the temperature of the laminate sample on an opposite side (pressurizing side) of the heating element was measured, and once the value thereof became stable, the temperature difference between a heating end and a measuring end was measured. The smaller this temperature difference is, the more favorable its heat conductivity is. Here, in all the samples, the temperature of the measuring end was stable after approximately 60 minutes from the start of the pressure bonding.

In evaluation of the insulation performance, interlayer resistance was measured according to a JIS method (JIS C2550). Then, one with interlayer resistance lower than 5 Ω·cm$^2$/piece was evaluated as X, one with interlayer resistance of 5 Ω·cm$^2$/piece to 10 Ω·cm$^2$/piece was evaluated as Δ, one with interlayer resistance of 10 Ω·cm$^2$/piece to 50 Ω·cm$^2$/piece was evaluated as ○, and one with interlayer resistance of 50 Ω·cm$^2$/piece or higher was evaluated as ⊚.

In evaluation of the adhesiveness, an adhesive tape was put on electrical steel sheet samples after being subjected to stress relieving annealing (annealing temperature 750° C. for two hours in a nitrogen atmosphere), and thereafter they were wrapped around metal bars having a diameter of 10 mm, 20 mm, 30 mm. Then the adhesive tape was peeled off, and the adhesiveness was evaluated from the peeled state. One which did not peel even when wrapped around the metal bar having a diameter of 10 mm was evaluated as 10 mmφ OK, and one which did not peel when wrapped around the metal bar having a diameter of 20 mm was evaluated as 20 mmφ OK. Further, one which did not peel when wrapped around the metal bar having a diameter of 30 mm was evaluated as 30 mmφ OK, and one which peeled off when wrapped around the metal bar having a diameter of 30 mm was evaluated as 30 mmφ OUT.

The corrosion resistance was evaluated according to a salt spray test of JIS method (JIS Z2371). Samples after 7 hours elapsed were used to perform 10-point evaluation. Criteria of evaluation are as follows.

10: No rust occurred

9: Slight rust occurred (0.1% or less in area ratio)

8: Area ratio of rust occurred=more than 0.1% and 0.25% or less

7: Area ratio of rust occurred=more than 0.25% and 0.50% or less

6: Area ratio of rust occurred=more than 0.50% and 1% or less

5: Area ratio of rust occurred=more than 1% and 2.5% or less

4: Area ratio of rust occurred=more than 2.5% and 5% or less

3: Area ratio of rust occurred=more than 5% and 10% or less

2: Area ratio of rust occurred=more than 10% and 25% or less

1: Area ratio of rust occurred=more than 25% and 50% or less

In evaluation of the appearance, one which is glossy, smooth and even was evaluated as 5, one which is glossy but less even was evaluated as 4, one which is slightly glossy and smooth but poor in evenness was evaluated as 3, one which has low gloss, slightly poor in smoothness and poor in evenness was evaluated as 2, and one which is poor in gloss, evenness, and smoothness was evaluated as 1.

Regarding the heat resistance, after being subjected to stress relieving annealing (annealing temperature 750° C. for two hours in a nitrogen atmosphere), a 2 mm×30 mm gauze was rubbed on a steel sheet surface with a load of 100 gf (approximately 0.98 N), and the heat resistance was evaluated based on a peeling state of the insulating film. One which did not peel was evaluated as 5, one which slightly peeled was evaluated as 4, one which clearly peeled was evaluated as 3, one which severely peeled was evaluated as 2, and one which peeled without being rubbed with the gauze was evaluated as 1.

In evaluation of the surface roughness, the centerline average roughness (Ra) was measured using a commercially available surface roughness measuring device according to a JIS method (JIS B0601).

These evaluation results are illustrated in Table 3.

TABLE 3

| | SAMPLE No. | HEAT CONDUCTIVITY | INSULATION PERFORMANCE | ADHESSIVENESS | CORRISION RESISTANCE | APPEARANCE | HEAT RESISTANCE | Ra (μm) |
|---|---|---|---|---|---|---|---|---|
| EXAMPLE | 1 | 18.3 | ◎ | 20 mm φ OK | 10 | 5 | 5 | 0.43 |
| | 2 | 17 | ◎ | 20 mm φ OK | 10 | 5 | 5 | 0.81 |
| | 3 | 17.3 | ◎ | 20 mm φ OK | 9 | 5 | 5 | 0.36 |
| | 4 | 17.4 | ◎ | 20 mm φ OK | 10 | 4 | 5 | 0.27 |
| | 5 | 15.1 | ○ | 20 mm φ OK | 7 | 5 | 5 | 0.41 |
| | 6 | 17.7 | ◎ | 20 mm φ OK | 9 | 4 | 4 | 0.53 |
| | 7 | 15.8 | ○ | 20 mm φ OK | 7 | 5 | 4 | 0.41 |
| | 8 | 16.2 | ○ | 20 mm φ OK | 8 | 4 | 4 | 0.38 |
| | 9 | 16.5 | ◎ | 20 mm φ OK | 9 | 4 | 5 | 0.31 |
| | 10 | 17.2 | ◎ | 30 mm φ OK | 7 | 4 | 5 | 0.33 |
| | 11 | 18.3 | ◎ | 20 mm φ OK | 7 | 4 | 4 | 0.63 |
| | 12 | 16.1 | ◎ | 30 mm φ OK | 8 | 5 | 4 | 0.43 |
| | 13 | 15.5 | ○ | 30 mm φ OK | 7 | 3 | 4 | 0.86 |
| COMPARATIVE EXAMPLE | 14 | 19.4 | ◎ | 30 mm φ OUT | 4 | 3 | 1 | 0.31 |
| | 15 | 20.6 | ◎ | 30 mm φ OUT | 6 | 3 | 1 | 0.36 |
| | 16 | 21.5 | ○ | 30 mm φ OK | 2 | 3 | 4 | 0.43 |
| | 17 | 21.2 | ○ | 30 mm φ OK | 2 | 3 | 3 | 1.02 |
| | 18 | 21.4 | ○ | 30 mm φ OUT | 3 | 4 | 1 | 1.27 |
| | 19 | 22.5 | ○ | 30 mm φ OK | 5 | 3 | 4 | 0.64 |
| | 20 | 30.4 | ○ | 20 mm φ OK | 7 | 2 | 1 | 0.35 |
| | 21 | 26.6 | ◎ | 30 mm φ OUT | 4 | 5 | 5 | 0.24 |
| | 22 | 31.8 | ◎ | 30 mm φ OK | 8 | 4 | 5 | 1.03 |
| | 23 | 28.4 | ◎ | 30 mm φ OK | 9 | 5 | 5 | 0.24 |
| | 24 | 16.3 | ○ | 30 mm φ OUT | 8 | 4 | 1 | 0.45 |
| | 25 | 29.4 | ○ | 30 mm φ OK | 5 | 5 | 4 | 0.21 |
| | 26 | 15.2 | △ | 30 mm φ OUT | 4 | 4 | 1 | 0.54 |

As illustrated in Table 3, the effect of the present invention was clear in this experiment. Specifically, as illustrated in Table 3, in the samples corresponding to the examples of the present invention, the temperature difference in evaluation of the heat conductivity is 20% or less, and it can be regarded as having excellent heat conductivity. It was also revealed that the samples corresponding to the examples of the present invention excel in insulation performance, adhesiveness, corrosion resistance, appearance and heat resistance in addition to the heat conductivity. Further, in many of the samples corresponding to the comparative examples, the temperature difference is as large as 20° C. or larger, and none of them excel in all of the insulation performance, adhesiveness, corrosion resistance, appearance and heat resistance.

In addition, the surface roughness of the obtained samples was 0.27 μm to 0.86 μm in the examples, and 0.21 μm to 1.27 μm in the comparative examples.

As has been described, in the electrical steel sheet according to the embodiment of the present invention, during production of a laminated iron core, the heat conductivity between electrical steel sheets improves by being heated when a varnish or powder is coated, and thereby it is possible to solve the problem of low heat conductivity in the lamination direction.

In the foregoing, the preferred embodiment of the present invention has been described in detail, but the invention is not limited to such an example. It is clear that any person having common knowledge in the art to which the invention pertains will be able to contrive various examples of changes and modifications within the category of the technical idea described in the claims, and it is understood that such changes and modifications naturally belong to the technical scope of the present invention.

INDUSTRIAL APPLICABILITY

The present invention can be used in, for example, electrical steel sheet manufacturing industry and electrical steel sheet utilizing industry.

The invention claimed is:

1. A method for manufacturing an electrical steel sheet, comprising: applying a treatment solution on a surface of a base iron: and
baking and drying the treatment solution,
wherein the treatment solution contains:
a first component: 100 parts by mass in solid content, the first component consisting of:
a colloidal silica having an average particle size of 5 nm to 40 nm and having an Na content of 0.5 mass % or less: 100 parts by mass; and
an emulsion of one kind selected from the group consisting of an acrylic resin, an epoxy resin and a polyester resin which have an average particle size of 0.05 um to 0.25 um, or an emulsion of a mixture or copolymer of two or three kinds selected from the group: 40 parts by mass to 400 parts by mass in resin solid content; and
a second component consisting of particles of one or more kinds selected from the group consisting of a polyolefin wax, an epoxy resin and an acrylic resin, the particles having an average particle size of 2.0 um to 15.0 um and a melting point of 60° C. to 140° C.: 5 parts by mass to 40 parts by mass in resin solid content,
wherein a solid content of the treatment solution substantially consists of the first component and the second component.

2. The method for manufacturing an electrical steel sheet according to claim 1, wherein a temperature to be reached in the baking and drying is 150° C. to 300° C., and a time therefor is 3 seconds to 15 seconds.

* * * * *